United States Patent
Das

(10) Patent No.: US 11,550,607 B2
(45) Date of Patent: Jan. 10, 2023

(54) PROCESSOR CORE POWER MANAGEMENT IN A VIRTUALIZED ENVIRONMENT

(71) Applicant: Red Hat, Inc., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 145 days.

(21) Appl. No.: 16/585,067

(22) Filed: Sep. 27, 2019

(65) Prior Publication Data

US 2021/0096896 A1  Apr. 1, 2021

(51) Int. Cl.
  *G06F 9/455* (2018.01)
  *G06F 9/50* (2006.01)
  *G06F 9/48* (2006.01)
  *G06F 1/28* (2006.01)

(52) U.S. Cl.
  CPC ............ *G06F 9/45558* (2013.01); *G06F 1/28* (2013.01); *G06F 9/4856* (2013.01); *G06F 9/5094* (2013.01); *G06F 2009/4557* (2013.01)

(58) Field of Classification Search
  CPC .. G06F 9/45558; G06F 9/4856; G06F 9/5094; G06F 2009/4557
  See application file for complete search history.

(56) References Cited

U.S. PATENT DOCUMENTS

| | | | |
|---|---|---|---|
| 9,395,786 B2 | 7/2016 | Talwar et al. | |
| 2007/0006227 A1* | 1/2007 | Kinney | G06F 9/45558 718/1 |
| 2007/0112999 A1* | 5/2007 | Oney | G06F 21/53 711/6 |
| 2009/0132840 A1* | 5/2009 | Talwar | G06F 1/3203 713/320 |
| 2010/0250998 A1* | 9/2010 | Herdrich | G06F 1/3203 713/501 |
| 2011/0161981 A1* | 6/2011 | Van De Ven | G06F 9/5094 718/107 |
| 2012/0036507 A1* | 2/2012 | Jonnala | H04L 67/34 717/178 |
| 2012/0159201 A1* | 6/2012 | Distefano | G06F 1/206 713/300 |
| 2013/0145188 A1* | 6/2013 | Gloekler | G06F 1/3296 713/322 |
| 2013/0155045 A1* | 6/2013 | Khodorkovsky | G06F 1/3206 345/212 |

(Continued)

OTHER PUBLICATIONS

Brown, Tony. "Deploying SAS® Grid Systems on VMware ESXi Virtually Provisioned Storage." 2018. (Year: 2018).*

(Continued)

*Primary Examiner* — Lewis A Bullock, Jr.
*Assistant Examiner* — Kevin X Lu
(74) *Attorney, Agent, or Firm* — Dority & Manning, P.A.

(57) ABSTRACT

Processor core power management in a virtualized environment. A hypervisor, executing on a processor device of a computing host, the processor device having a plurality of processor cores, receives from a guest operating system of a virtual machine, a request to set a virtual central processing unit (VCPU) of the virtual machine to a first requested P-state level of a plurality of P-state levels. Based on the request, the hypervisor associates the VCPU with a first processor core having a P-state that corresponds to the first requested P-state level.

18 Claims, 16 Drawing Sheets

(56) References Cited

U.S. PATENT DOCUMENTS

| | | | |
|---|---|---|---|
| 2014/0149763 A1* | 5/2014 | Allen-Ware | G06F 1/3296 713/320 |
| 2015/0242229 A1* | 8/2015 | van Riel | G06F 9/45545 718/1 |
| 2016/0077571 A1* | 3/2016 | Sagar | G06F 1/3243 713/340 |
| 2016/0147275 A1* | 5/2016 | Weissmann | G06F 1/3206 713/322 |
| 2016/0179184 A1* | 6/2016 | Shah | G06F 1/324 713/320 |
| 2016/0203012 A1* | 7/2016 | Dong | G06F 9/4893 718/1 |
| 2017/0285730 A1* | 10/2017 | Min | G06F 1/3243 |
| 2018/0173553 A1* | 6/2018 | Warkentin | G06F 1/3287 |
| 2019/0278355 A1* | 9/2019 | Faasse | G06F 1/324 |

OTHER PUBLICATIONS

Kang, Ki-Dong, et al. "VIP: Virtual performance-state for efficient power management of virtual machines." Oct. 11, 2018. Proceedings of the ACM Symposium on Cloud Computing. (Year: 2018).*

Chen et al. "ClientVisor: Leverage COTS OS Functionalities for Power Management in Virtualized Desktop Environment". Jul. 31, 2009. ACM SIGOPS Operating Systems Review, 43(3), pp. 62-71. (Year: 2009).*

Data Plane Development Kit (DPDK). "Virtual Machine Power Management Application". 2014. Intel Corporation. <https://doc.dpdk.org/guides-20.08/_sources/sample_app_ug/vm_power_management.txt> (Year: 2014).*

Gough et al. "Energy efficient servers: blueprints for data center optimization". 2015. Springer Nature. Chapter 6, pp. 173-208. (Year: 2015).*

Author Unknown, "Power Management high-level design," projectacrn.github.io/0.6/developer-guides/hld/hld-power-management.html, Jun. 3, 2019, 5 pages.

Author Unknown, "Power Management States: P-States, C-States, and Package C-States," software.intel.com/en-us/articles/power-management-states-p-states-c-states-and-package-c-states, Apr. 17, 2014, 22 pages.

Kang, Ki-Dong, et al., "VIP: Virtual Performance-State for Efficient Power Management of Virtual Machines," ACM Symposium on Cloud Computing, Oct. 2018, Carlsbad, California, ACM, 12 pages.

* cited by examiner

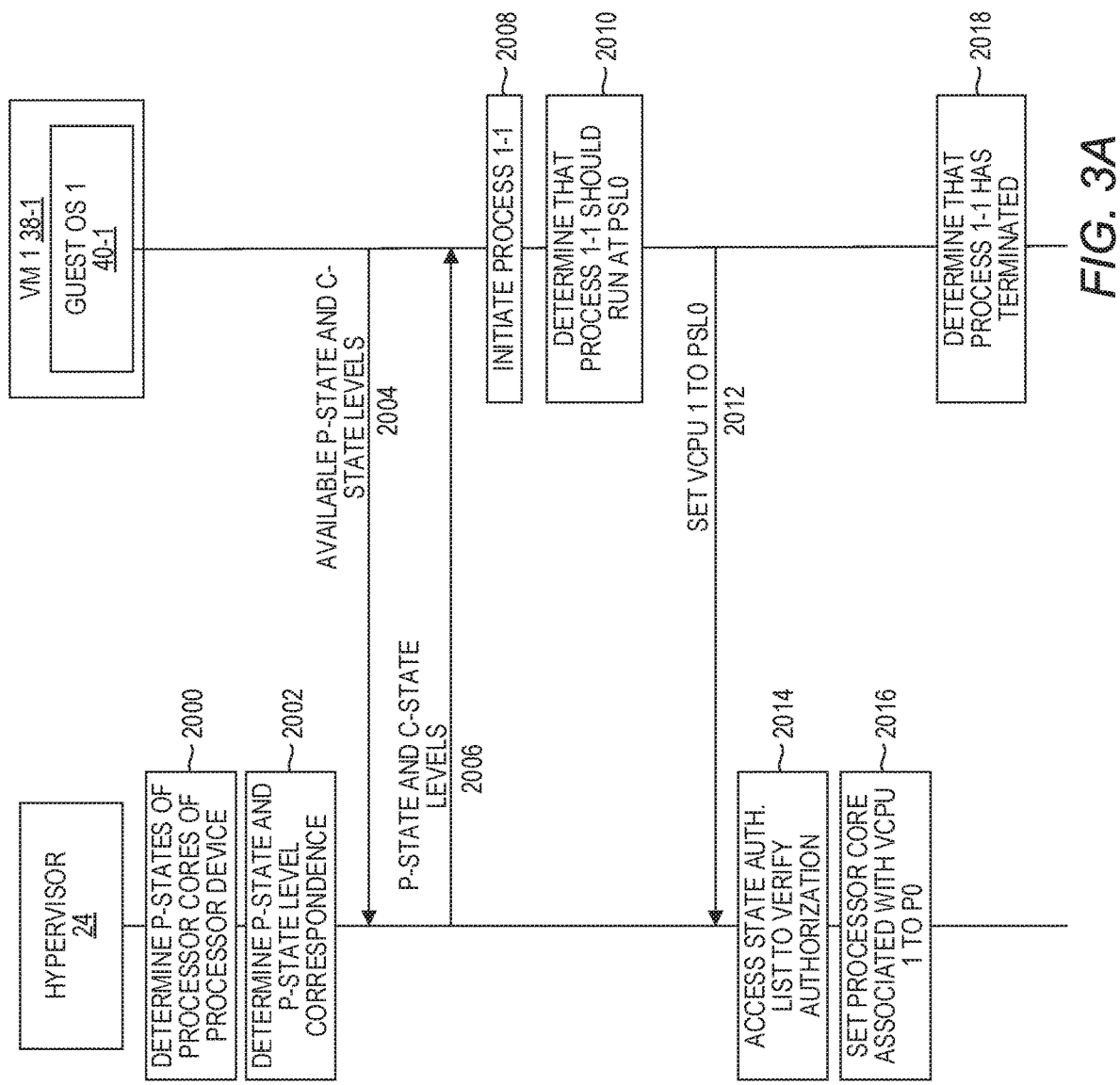

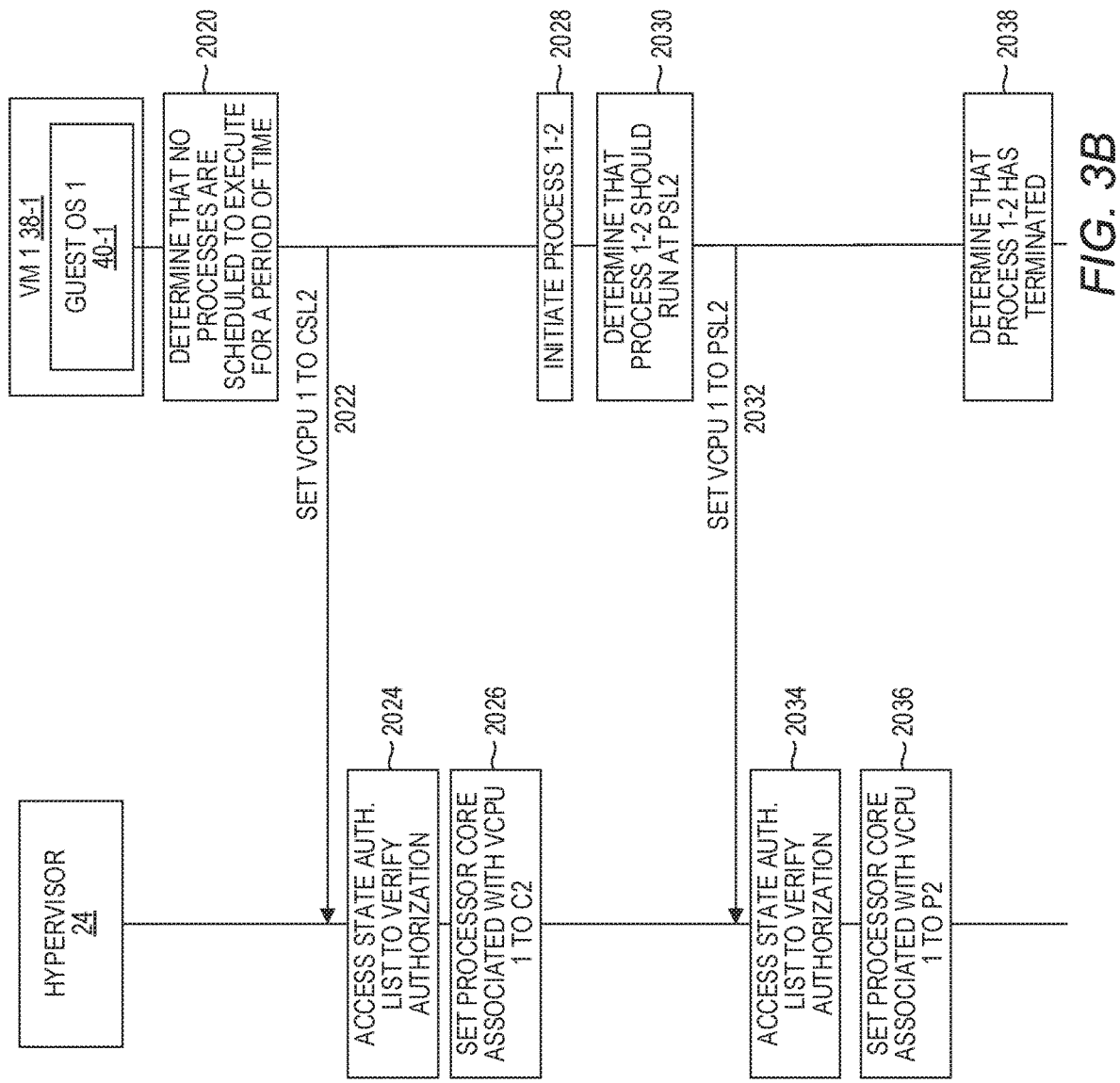

PROCESSOR CORE POWER MANAGEMENT IN A VIRTUALIZED ENVIRONMENT

BACKGROUND

Many modern-day processor devices, such as Intel® and AMD® processor devices, have multiple processor cores to facilitate parallel processing of threads. Many processor devices also have processor cores that can utilize different P-states and C-states. Generally, different P-states involve different processor frequencies, and different C-states involve different processor voltages.

SUMMARY

The examples disclosed herein implement processor core power management in a virtualized environment. In particular, the examples disclosed herein expose processor core power state levels to a guest operating system (OS) of a virtual machine and, based on a request from the guest OS to set the virtual central processing unit (VCPU) of the virtual machine to a requested P-state level or C-state level, associate the VCPU with a processor core having a P-state that corresponds to the requested P-state level or a C-state having the requested C-state level.

In one example a method is disclosed. The method includes receiving, by a hypervisor executing on a processor device of a computing host, the processor device having a plurality of processor cores, from a first guest OS of a first virtual machine (VM), a request to set a VCPU of the first virtual machine to a first requested P-state level of a plurality of P-state levels. The method further includes, based on the request, associating, by the hypervisor, the VCPU with a first processor core having a P-state that corresponds to the first requested P-state level.

In another example a computing host is provided. The computing host includes a memory, and a processor device having a plurality of processor cores. The processor device, coupled to the memory, is to receive, by a hypervisor, from a guest OS of a first VM, a request to set a VCPU of the first VM to a first requested P-state level of a plurality of P-state levels. The processor device is further to, based on the request, associate the VCPU with a first processor core having a P-state that corresponds to the first requested P-state level.

In another example a computer program product is disclosed. The computer program product is stored on a non-transitory computer-readable storage medium and includes instructions to cause a processor device to receive, by a hypervisor, from a guest OS of a first VM, a request to set a VCPU of the first VM to a first requested P-state level of a plurality of P-state levels. The instructions further cause the processor device to, based on the request, associate the VCPU with a first processor core having a P-state that corresponds to the first requested P-state level.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 3A-3C illustrate a message flow diagram showing example messages between certain of the components illustrated in FIG. 1 and actions taken by such components for processor core power management in a virtualized environment according to one example;

DETAILED DESCRIPTION

Figure 1:
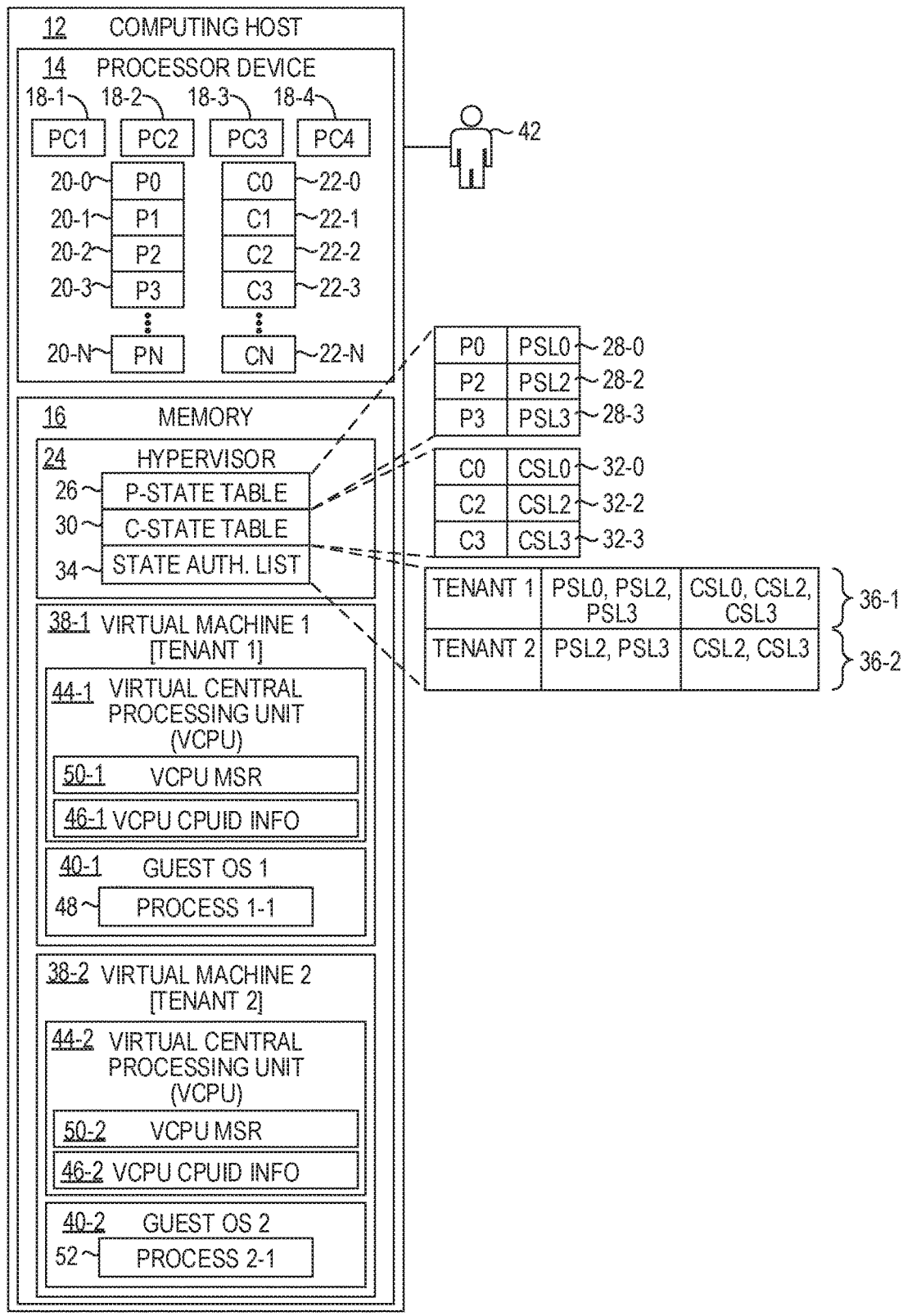
FIG. 1 is a block diagram of an environment in which processor core power management in a virtualized environment may be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Many modern-day processor devices, such as Intel® and AMD® processor devices, have multiple processor cores to facilitate parallel processing of threads. Many processor devices also have processor cores that can utilize different P-states, each of which is associated with a different voltage and/or frequency.

Virtual machine (VM) virtualization technology allows complete isolation between computing environments that run on the same physical computing host. A virtual machine monitor (VMM), sometimes referred to as a hypervisor, allocates physical resources, such as processor devices and memory, to multiple VMs. Each VM executes an operating system (OS), referred to herein as a guest OS, that can execute processes independently of any other VM executing on the computing host. VMs are used extensively by cloud computing providers to facilitate on-demand computing by different tenants (e.g., customers).

Typically, a guest OS executing in a VM has no access to the P-states or C-states of processor cores of the physical processor devices of a computing host on which the VM executes. However, it may be desirable in many circumstances for a guest OS to be able to request that the P-state or C-state of a processor core associated with the VM be set to a particular setting. For example, where a cloud computing provider determines fees based on power usage, it may be desirable for a customer to manage power usage via the P-states and C-states of the processor cores. Additionally, from an environmental perspective, it may be useful to manage power usage via the P-states and C-states of the processor cores. Moreover, some workloads may benefit from higher frequencies/voltages than typically offered by a particular cloud computing provider.

The examples disclosed herein implement processor core power management in a virtualized environment. In particular, the examples disclosed herein expose processor core power state levels to a guest OS of a VM, and based on a request from the guest OS to set the virtual central processing unit (VCPU) of the VM to a requested P-state level, associates the VCPU with a processor core having a P-state that corresponds to the requested P-state level.

FIG. 1 is a block diagram of an environment 10 in which examples may be practiced. In some implementations, the environment 10 may a cloud computing environment, but the examples disclosed herein are not limited to a cloud computing environment. The environment 10 includes a computing host 12 that includes a processor device 14 and a memory 16. The processor device 14 comprises four processor cores 18-1-18-4 (PC1, PC2, PC3 and PC4, respectively.) The processor device 14 may comprise any suitable processor device that supports multiple P-states, such as, by way of non-limiting example, Intel® processor devices and AMD® processor devices. Each processor core 18 can be set to any of a plurality of different P-states 20-0, 20-1, 20-2, 20-3-20-N (generally, P-states 20). Each P-state 20 represents a different frequency and/or voltage combination at which a processor core 18 can be set while executing instructions. Each processor core 18 can also be set to any of a plurality of different idle C-states 22-0, 22-1, 22-2, 22-3-22-N (generally, C-states 22). Non-limiting examples of C-states include: C0—Active Mode: code is executed, in this state the P-States are relevant; C1—auto halt; C1E—auto halt, low frequency, low voltage; C2—temporary state before C3, memory path open; C3—L1/L2 caches flush, clocks off; C6—save core states before shutdown and PLL off; C7–C6+LLC may be flushed; and C8–C7+LLC must be flushed.

A VMM, referred to herein as a hypervisor 24, implements a virtualized environment via VM virtualization technology on the computing host 12. The VM virtualization technology may comprise, by way of non-limiting example, Red Hat Enterprise Linux virtualization technology, VMware® virtualization technology, Microsoft® Hyper-V virtualization technology, Oracle VM Server for SPARC virtualization technology, or the like.

The hypervisor 24 determines what P-states and C-states are available for the processor device 14, and thus the P-states and C-states to which the processor cores 18 can be set. In one implementation, this may be provided by a configuration file. In one example, the hypervisor 24 may query one or more model specific registers associated with the processor cores 18 to determine the available P-states and C-states. The hypervisor 24 generates, or has access to, a P-state table 26 that correlates the P-states 20 to P-state levels that are exposed to VMs that are managed by the hypervisor 24. In some examples, the P-state levels may be identical to the P-states 20, and thus each available P-state 20 is exposed to VMs. In other implementations, as illustrated in FIG. 1 for example, where it may be desirable to inhibit a guest OS of a VM from requesting that a processor core 18 be set to certain P-states 20, the P-state levels to which a guest OS may request a VCPU be set may be a subset of available P-states 20. In this example the guest OSs of VMs executing on the computing host 12 can request that corresponding VCPUs be set to a P-state level 28-0, which corresponds to the P-state 20-0 (P0); a P-state level 28-2, which corresponds to the P-state 20-2 (P2); and a P-state level 28-3, which corresponds to the P-state 20-3 (P3).

The hypervisor 24 may also generate, or have access to, a C-state table 30 that correlates the C-states 22 to C-state levels that are exposed to VMs that are managed by the hypervisor 24. Again, in some examples, the C-state levels may be identical to the C-states 22, and thus each available C-state 22 is exposed to VMs. In other implementations, where it may be desirable to inhibit a guest OS of a VM from requesting that a processor core 18 be set to certain C-states 22, the C-state levels to which a guest OS may request a VCPU be set may be a subset of available C-states 22. In this example the guest OSs of VMs executing on the computing host 12 can request that corresponding VCPUs be set to a C-state level 32-0, which corresponds to the C-state 22-0 (C0); a C-state level 32-2, which corresponds to the C-state 22-2 (C2); and a C-state level 32-3, which corresponds to the C-state 22-3 (C3).

In some implementations the hypervisor 24 may also maintain a state authorization list 34 that inhibits access to certain available P-states based on some criteria. In this example, the state authorization list 34 includes an entry 36-1 that indicates that VMs associated with a first tenant ("Tenant 1") may request that a VCPU be set to a set of P-states P0, P2, and P3, via P-state levels 28-0, 28-2, and 28-3, respectively, and a set of C-states C0, C2 and C3, via C-state levels 32-0, 32-2, and 32-3, respectively. An entry 36-2 indicates that VMs associated with a second tenant ("Tenant 2") may request that a VCPU be set to P-states P2 and P3 via P-state levels 28-2 and 28-3, respectively, and to C-states C2 and C3 via C-state levels 32-2 and 32-3, respectively. Entries in the state authorization list 34 may be based on any desirable criteria that can be associated with a VM managed by the hypervisor 24, including, for example, tenant, subscription level, or the like.

The hypervisor 24, in response to some event, initiates a VM 38-1 that includes a guest OS 40-1, and which is associated with the Tenant 1. The event, for example, may be an input from an operator 42, a programmatic request from some other process, the determination by the hypervisor 24 that some condition has been met, or the like. The guest OS 40-1 may comprise any suitable operating system, including, by way of non-limiting example, a Linux operating system, a Windows® operating system, or the like.

The hypervisor 24 communicates the plurality of P-state levels 28-0, 28-2 and 28-3 and C-state levels 32-0, 32-2 and 32-3 to the guest OS 40-1. This may be done in any suitable manner via which the guest OS 40-1 and the hypervisor 24 can exchange information. By way of non-limiting example, in one implementation, as part of running the VM 38-1, the hypervisor 24 provides the VM 38-1 a VCPU 44-1. The VCPU 44-1 appears to the guest OS 40-1 as a processor core 18; however, the VCPU 44-1 is a construct used by the hypervisor 24 to allocate processing time to the VM 38-1 on one of the processor cores 18.

The VCPU 44-1 has associated VCPU CPUID information 46-1 that contains information about the VCPU 44-1. The hypervisor 24 may alter a predetermined field of the CPUID information 46-1 to identify the plurality of P-state levels 28-0, 28-2 and 28-3 and C-state levels 32-0, 32-2 and 32-3. The guest OS 40-1 may then query the CPUID information 46-1 to determine the plurality of P-state levels 28-0, 28-2 and 28-3 and C-state levels 32-0, 32-2 and 32-3 to which the VCPU 44-1 can be set. In another implementation, the hypervisor 24 may provide a hypercall function which, when invoked by the guest OS 40-1, returns the plurality of P-state levels 28-0, 28-2 and 28-3 and C-state levels 32-0, 32-2 and 32-3. In some implementations, the guest OS 40-1 may query a VCPU model specific register (MSR) 50-1 that is associated with the VCPU 44-1 to obtain the P-state levels 28-0, 28-2 and 28-3 and C-state levels 32-0, 32-2 and 32-3.

It will be noted that because the guest OS 40-1 is a component of the computing host 12, functionality implemented by the guest OS 40-1 may be attributed to the computing host 12 generally. Moreover, because the guest OS 40-1 comprises software instructions that program the processor device 14 to carry out functionality discussed herein, functionality implemented by the guest OS 40-1 may be attributed herein to the processor device 14.

The guest OS 40-1 initiates a process 48. The guest OS 40-1 sends a request to the hypervisor 24 to set the P-state of the VCPU 44-1 to a requested P-state level 28-0 (PSL0). The request may be sent to the hypervisor 24 in any suitable manner via which the guest OS 40-1 and the hypervisor 24 can exchange information. In one implementation, the hypervisor 24 may provide a hypercall function which can be invoked by the guest OS 40-1 to communicate the request to the hypervisor 24 to set the P-state of the VCPU 44-1 to the requested P-state level 28-0 (PSL0). In another implementation, the guest OS 40-1 initiates the request to the hypervisor 24 to set the P-state of the VCPU 44-1 to a requested P-state level 28-0 by attempting to store P-state information in the VCPU MSR 50-1 that is associated with the VCPU 44-1. The P-state information indicates that the VCPU should be set to the requested P-state level 28-0. The attempt to store the P-state information in the MSR 50-1 by the guest OS 40-1 causes a VMEXIT event and an execution transfer to the hypervisor 24. The hypervisor 24 determines that the guest OS 40-1 was attempting to set the VCPU 44-1 to the P-state level 28-0.

The hypervisor 24 receives the request and may access the state authorization list 34 to ensure that the guest OS 40-1 is authorized to request that a processor core 18 be set to the P-state level 28-0. The hypervisor 24 determines that the VCPU 44-1 is associated with the processor core 18-2. The hypervisor 24 then sets the P-state of the processor core 18-2 to P0. In some implementations, the hypervisor 24 may pin the VCPU 44-1 to a particular processor core 18, such that the VCPU 44-1 is associated with the same processor core 18.

In yet another implementation, particularly where a VCPU 44-1 is pinned to a particular processor core 18, the hypervisor 24 modifies a Virtual Machine Control Structure such that the MSR 50-1 of the VCPU 44-1 maps directly to the MSR of the particular processor core 18, and an attempted write to the MSR 50-1 modifies the MSR of the particular processor core 18 without causing a VMEXIT event.

The hypervisor 24, in response to some event, initiates a VM 38-2 that includes a guest OS 40-2 and a VCPU 44-2 and that is associated with the Tenant 2. The VCPU 44-2 has associated VCPU CPUID information 46-2 and a VCPU MSR 50-2. The hypervisor 24 communicates a set of P-state levels 28-2, 28-3 and C-state levels 32-2, 32-3 to the guest OS 40-2. The guest OS 40-2 initiates a process 52. The guest OS 40-2 sends a request to the hypervisor 24 to set the P-state of the VCPU 44-1 to a requested P-state level 28-2 (PSL2). The hypervisor 24 receives the request and may access the state authorization list 34 to ensure that the guest OS 40-2 is authorized to request that a processor core be set to the P-state level 28-2. The hypervisor 24 determines that the VCPU 44-2 is associated with the processor core 18-1. The hypervisor 24 then sets the P-state of the processor core 18-1 to P2. In some implementations, the hypervisor 24 may pin the VCPU 44-2 to the processor core 18-1.

Again, in one implementation, such as where the VCPU 44-2 is pinned to the processor core 18-1, the hypervisor 24 may modify the Virtual Machine Control Structure such that the MSR 50-2 of the VCPU 44-2 maps directly to the MSR of the processor core 18-1, and the guest OS 40-2 may write to the MSR 50-2 to thereby directly modify the MSR of the processor core 18-2, without causing a VMEXIT event to the hypervisor 24.

Figure 2:
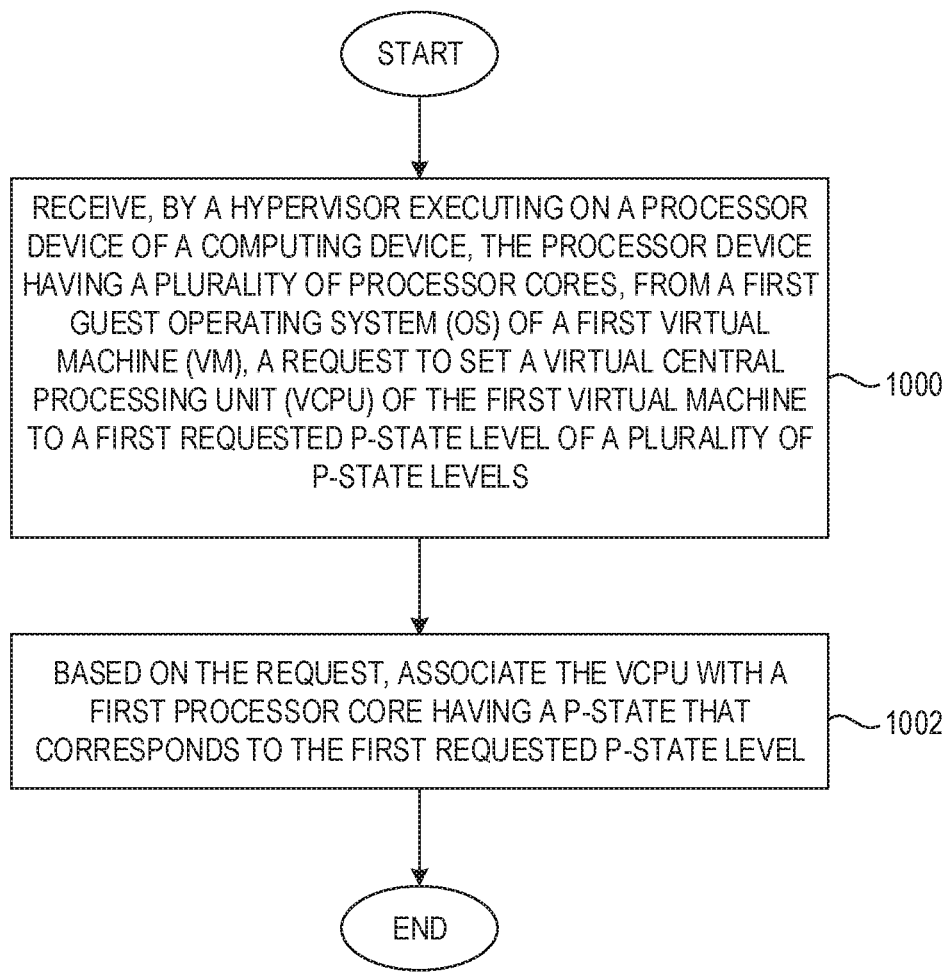
FIG. 2 is a flowchart of a method for processor core power management in a virtualized environment according to one implementation.

FIG. 2 is a flowchart of a method for processor core power management in a virtualized environment according to one implementation. FIG. 2 will be discussed in conjunction with FIG. 1. The hypervisor 24, executing on the processor device 14 of the computing host 12, the processor device 14 having the plurality of processor cores 18, receives, from the guest OS 40-1 of the first VM 38-1, a request to set the VCPU 44-1 of the VM 38-1 to the first requested P-state level 28-0 of the plurality of P-state levels 28-0, 28-2 and 28-3 (FIG. 2, block 1000). Based on the request, the hypervisor 24 associates the VCPU 44-1 with the processor core 18-2 having the P-state that corresponds to the first requested P-state level 28-0 (FIG. 2, block 1002). In particular, the hypervisor 24 sets the P-state of the processor core 18-2 to P0.

Figure 3C:
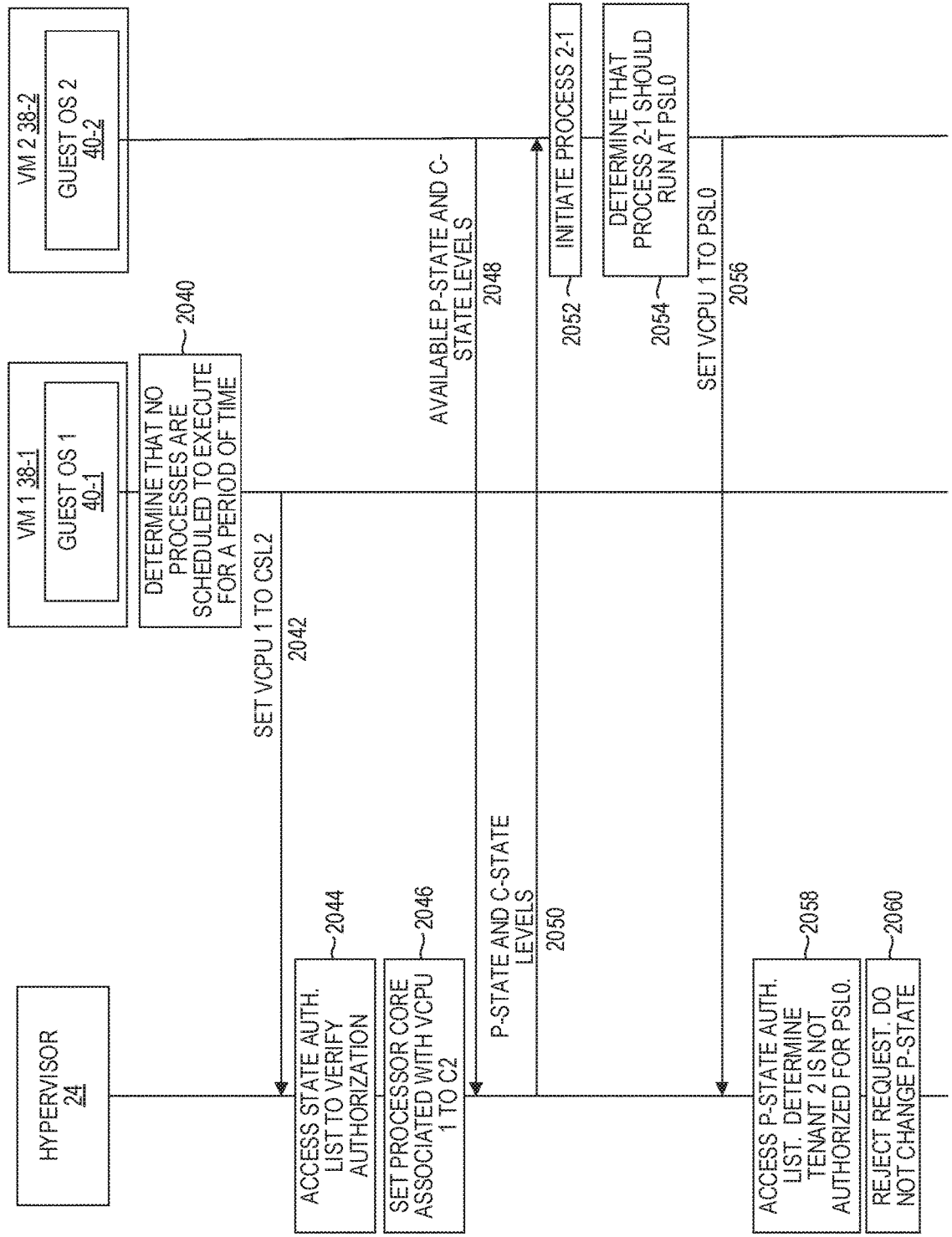

FIGS. 3A-3C illustrate a message flow diagram showing example messages between certain of the components illustrated in FIG. 1 and actions taken by such components for processor core power management in a virtualized environment according to one example. At block 2000 the hypervisor 24 determines the plurality of P-states 20 and C-states 22 to which a processor core 18 can be set. At block 2002 the hypervisor 24 determines the P-state and P-state level correspondence, and the C-state and C-state level correspondence, via the P-state table 26 and the C-state table 30. In some implementations, the P-state table 26 and the C-state table 30 may be established by the operator 42. The hypervisor 24 initiates the VM 38-1. At block 2004 the guest OS 40-1 communicates a request to the hypervisor 24 for the available P-state levels 28 and the available C-state levels 32. At block 2006 the hypervisor 24 communicates the set of P-state levels 28 and C-state levels 32 to which the guest OS 40-1 can set the VCPU 44-1. At block 2008 the guest OS 40-1 initiates the process 48. At block 2010 the guest OS 40-1 determines that the process 48 should execute at the P-state level 28-0. In one implementation this determination is made in response from a command from the operator 42 that requests that the process 48 execute at the P-state level 28-0. At block 2012 the guest OS 40-1 sends a request to the hypervisor 24 to set the VCPU 44-1 to the P-state level 28-0. At block 2014 the hypervisor 24 accesses the state authorization list 34 and determines, based on the entry 36-1, that the guest OS 40-1 is authorized to request that the VCPU 44-1 be set to the P-state level 28-0.

The hypervisor 24 determines that the VCPU 44-1 is associated with the processor core 18-2, and at block 2016 sets the processor core 18-2 to the P-state 20-0. The hypervisor 24 may pin the processor core 18-2 to the VCPU 44-1 so that any thread (e.g., process) associated with the VCPU 44-1 is executed by the processor core 18-2.

At a subsequent point in time, at block 2018 the guest OS 40-1 determines that the process 48 has terminated. Referring now to FIG. 3B, at block 2020 the guest OS 40-1 accesses a schedule and determines that no process is scheduled to be executed for a period of time. At block 2022, the guest OS 40-1 sends a request to the hypervisor 24 to set the VCPU 44-1 to the C-state level 32-2. In some implementations, this may be accomplished, for example, by executing a Monitor and/or Mwait instruction. At block 2024, the hypervisor 24 accesses the state authorization list 34 and determines, based on the entry 36-1, that the guest OS 40-1 is authorized to request that the VCPU 44-1 be set to the C-state level 32-2. The hypervisor 24 determines that the VCPU 44-1 is associated with the processor core 18-2 and, at block 2026, sets the processor core 18-2 to the C-state 22-2.

At a subsequent point in time, at block 2028, the guest OS 40-1 initiates a process 1-2. At block 2030, the guest OS 40-1 determines that the process 1-2 should execute at the P-state level 28-2. At block 2032 the guest OS 40-1 sends a request to the hypervisor 24 to set the VCPU 44-1 to the P-state level 28-2. At block 2034 the hypervisor 24 accesses the state authorization list 34 and determines, based on the entry 36-1, that the guest OS 40-1 is authorized to request that the VCPU 44-1 be set to the P-state level 28-2. The hypervisor 24 determines that the VCPU 44-1 is associated with the processor core 18-2 and, at block 2036, sets the processor core 18-2 to the P-state 20-2 (P2).

At a subsequent point in time, at block 2038 the guest OS 40-1 determines that the process 1-2 has terminated. Referring now to FIG. 3C, at block 2040 the guest OS 40-1 accesses a schedule and determines that no process is scheduled to be executed for a period of time. At block 2042, the guest OS 40-1 sends a request to the hypervisor 24 to set the VCPU 44-1 to the C-state level 32-2. At block 2044, the hypervisor 24 accesses the state authorization list 34 and determines, based on the entry 36-1, that the guest OS 40-1 is authorized to request that the VCPU 44-1 be set to the C-state level 32-2.

The hypervisor 24 determines that the VCPU 44-1 is associated with the processor core 18-2, and at block 2046 sets the processor core 18-2 to the C-state 22-2 (C2).

The hypervisor 24 initiates the VM 38-2. At block 2048 the guest OS 40-2 communicates a request to the hypervisor 24 for the available P-state levels 28 and the available C-state levels 32. At block 2050 the hypervisor 24 communicates the P-state levels 28-2 and 28-3, and the C-state levels 32-2 and 32-3 to the guest OS 40-2. At block 2052 the guest OS 40-2 initiates the process 52. At block 2054 the guest OS 40-2 determines that the process 52 should execute at the P-state level 28-0. In one implementation this determination is made in response from a command from the operator 42 that requests that the process 52 execute at the P-state level 28-0. At block 2056 the guest OS 40-2 sends a request to the hypervisor 24 to set the VCPU 44-2 to the P-state level 28-0. At block 2058 the hypervisor 24 accesses the state authorization list 34 and determines, based on the entry 36-2, that the guest OS 40-2 is not authorized to request that the VCPU 44-2 be set to the P-state level 28-0. At block 2060 the hypervisor 24 rejects the request and does not alter the P-state of the processor core 18 that is executing the process 52.

Figure 4A:
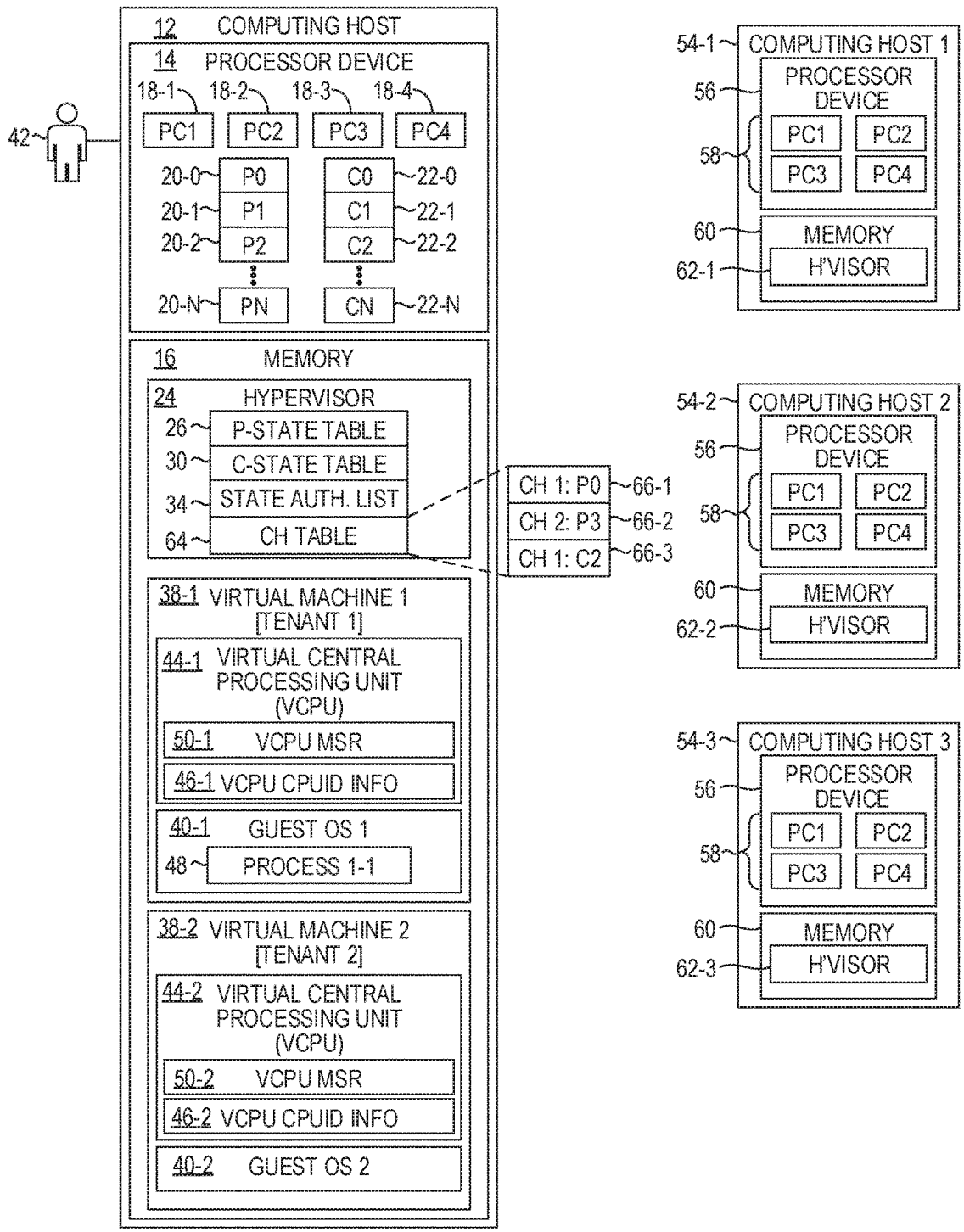
FIGS. 4A-4C illustrate block diagrams of an environment for implementing processor core power management in a virtualized environment according to another implementation.
Figure 4B:
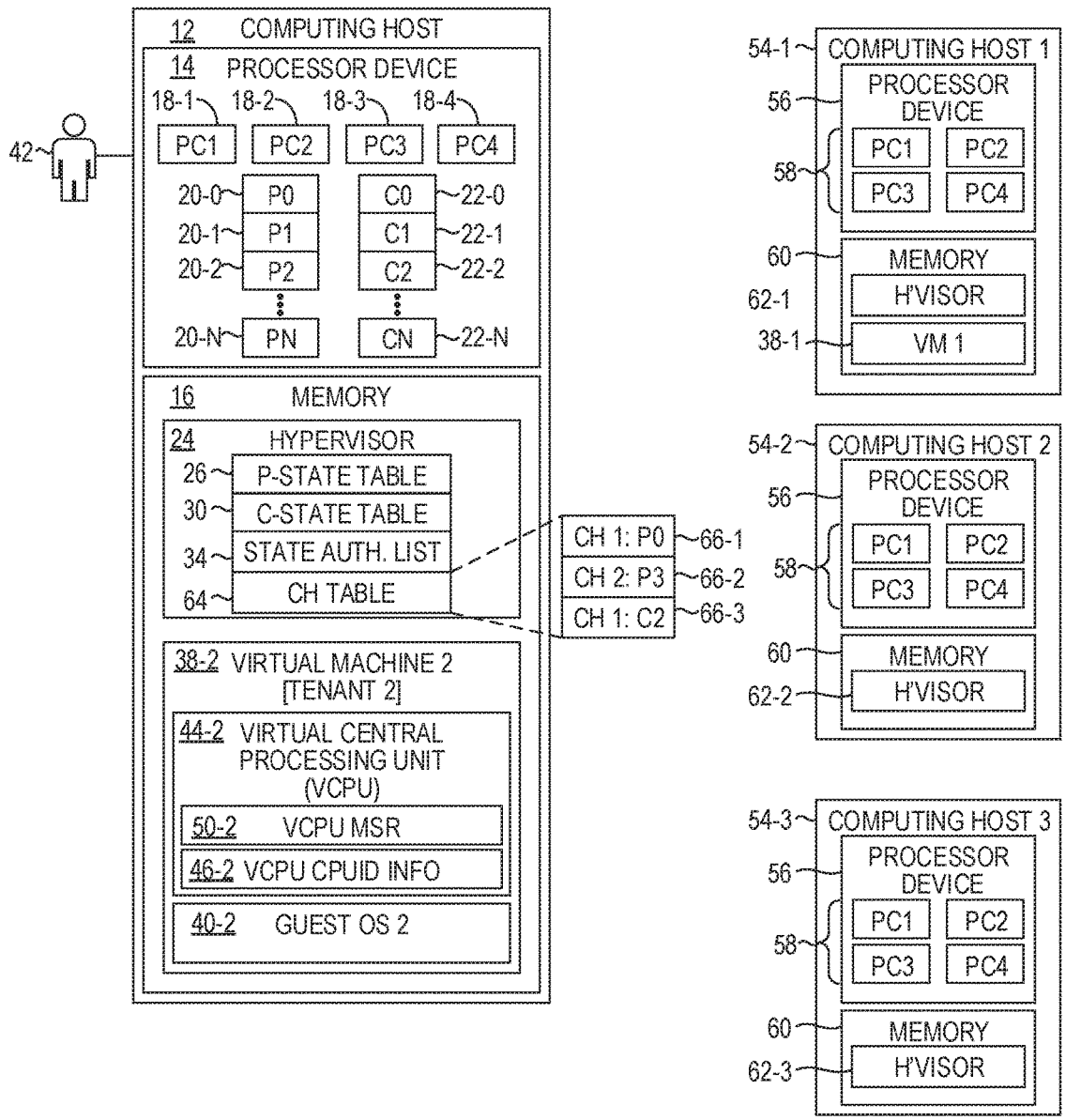
Figure 4C:
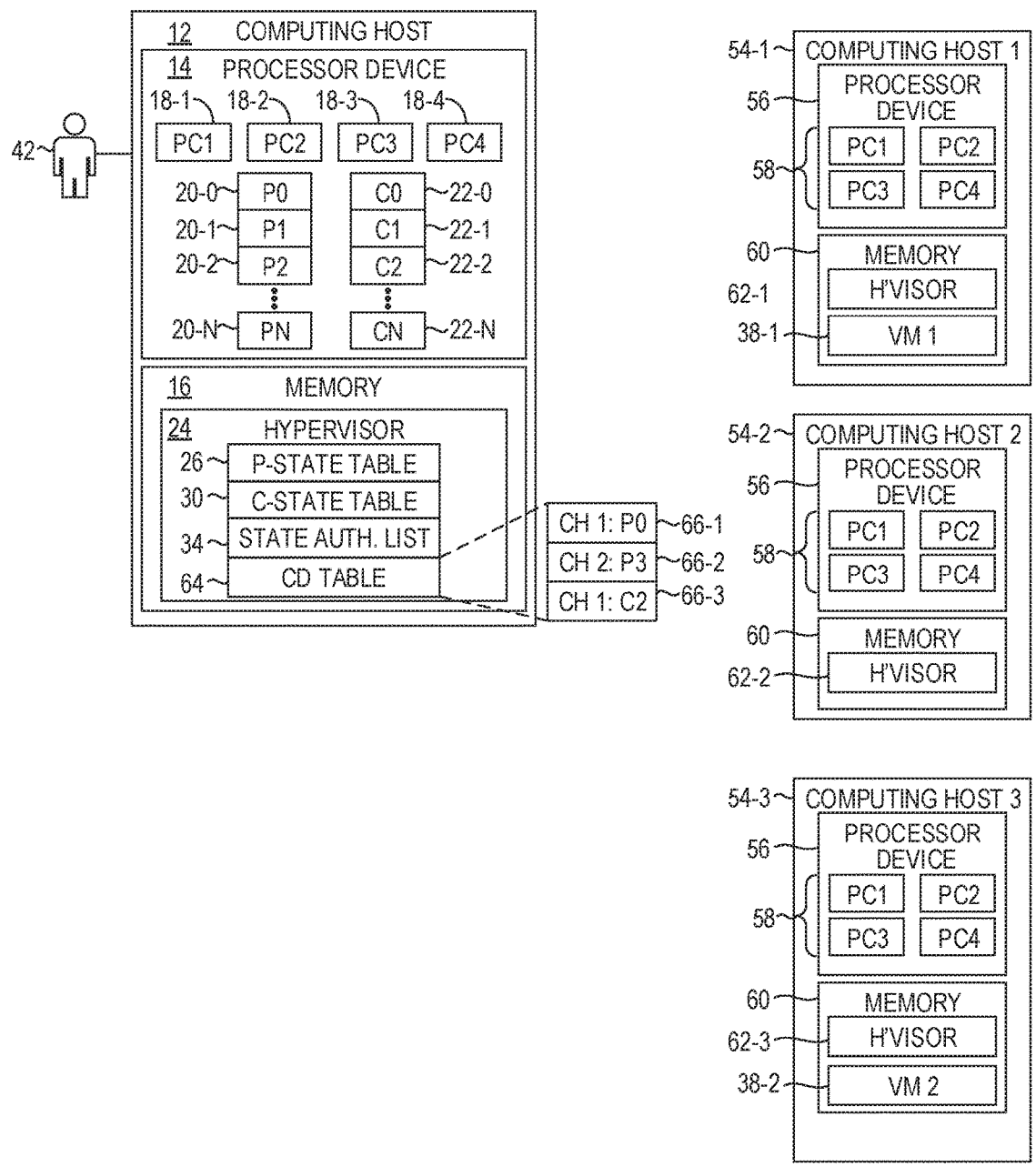

FIGS. 4A-4C illustrate block diagrams of an environment 10-1 for implementing processor core power management in a virtualized environment according to another implementation. Referring first to FIG. 4A, in this example the environment 10-1 includes the computing host 12 and a plurality of computing hosts 54-1-54-3 (generally, computing hosts 54). Each of the computing hosts 54 includes a processor device 56, a plurality of processor cores 58, and a memory 60. Each of the computing hosts 54-1-54-3 implement a virtualized environment via hypervisors 62-1-62-3, respectively. The processor cores 58 of the computing host 54-1 are set to a P-state of P0, the processor cores 58 of the computing host 54-2 are set to a P-state of P3, and the processor cores 58 of the computing host 54-3 are set to an idle C-state of C2.

The hypervisor 24 of the computing host 12 includes a computing host (CH) table 64 that contains entries 66-1-66-3, each of which corresponds to a computing host 54-1-54-3, and identifies the P- or C-state of the corresponding computing host 54-1-54-3. Similar to process discussed above with regard to FIG. 1, the hypervisor 24, in response to some event, initiates the VM 38-1 that includes the guest OS 40-1. The hypervisor 24 communicates the set of P-state levels 28-0, 28-2 and 28-3 and C-state levels 32-0, 32-2 and 32-3 to the guest OS 40-1. The guest OS 40-1 initiates the process 48. The guest OS 40-1 sends a request to the hypervisor 24 to set the P-state of the VCPU 44-1 to a requested P-state level 28-0 (PSL0).

The hypervisor 24 receives the request and accesses the state authorization list 34 and verifies that the guest OS 40-1 has authorization to request that the P-state of the VCPU 44-1 be set to the P-state level 28-0 (PSL0). The hypervisor 24, in response to the request, accesses the CH table 64 and determines that the computing host 54-1 has processor cores 58 that are set to the P-state P0. The hypervisor 24 interacts with the computing host 54-1 to migrate the VM 38-1 from the computing host 12 to the computing host 54-1.

The hypervisor 24, in response to some event, initiates the VM 38-2. The hypervisor 24 communicates the plurality of P-state levels 28-2, 28-3 and C-state levels 32-2, 32-2 to the guest OS 40-2. At some point in time, the guest OS 40-2 determines that no processes are scheduled to run, and sends a request to the hypervisor 24 to set the VCPU 44-2 to the C-state level 32-2. The hypervisor 24 accesses the state authorization list 34 and determines, based on the entry 36-2, that the guest OS 40-2 is authorized to request that the VCPU 44-1 be set to the C-state level 32-2. The hypervisor 24 accesses the CH table 64 and determines that the computing host 54-3 has processor cores 58 that are set to the C-state C2. The hypervisor 24 interacts with the computing host 54-3 to migrate the VM 38-2 from the computing host 12 to the computing host 54-3, as illustrated in FIG. 4C.

It should be noted that while for purposes of illustration only the two VMs 38-1 and 38-2 are discussed, each of the computing hosts 54 may have any number of VMs migrated to the respective computing hosts 54 based on the P- or C-state levels requested by such VMs.

In some implementations, the computing host 12 may provide processor core power management in a virtualized environment that operates for some requests as illustrated in FIG. 1, and for other request as illustrated in FIGS. 4A-4C. For example, the computing host 12 may maintain the processor cores 18-1-18-4 at predetermined P- and C-states. If a guest OS of a VM running on the computing host 12 requests that a VCPU be set to a P- or C-state level that corresponds to one of the predetermined P- or C-states of the processor cores 18-1-18-4, the hypervisor 24 associates the VCPU with the corresponding processor core 18-1-18-4. If, on the other hand, a guest OS of a VM running on the computing host 12 requests that a VCPU be set to a P- or C-state level that does not correspond to one of the predetermined P- or C-states of the processor cores 18-1-18-4, the hypervisor 24 migrates the VM to a computing host 54 whose processor cores are set to the requested P- or C-state level.

Figure 5:
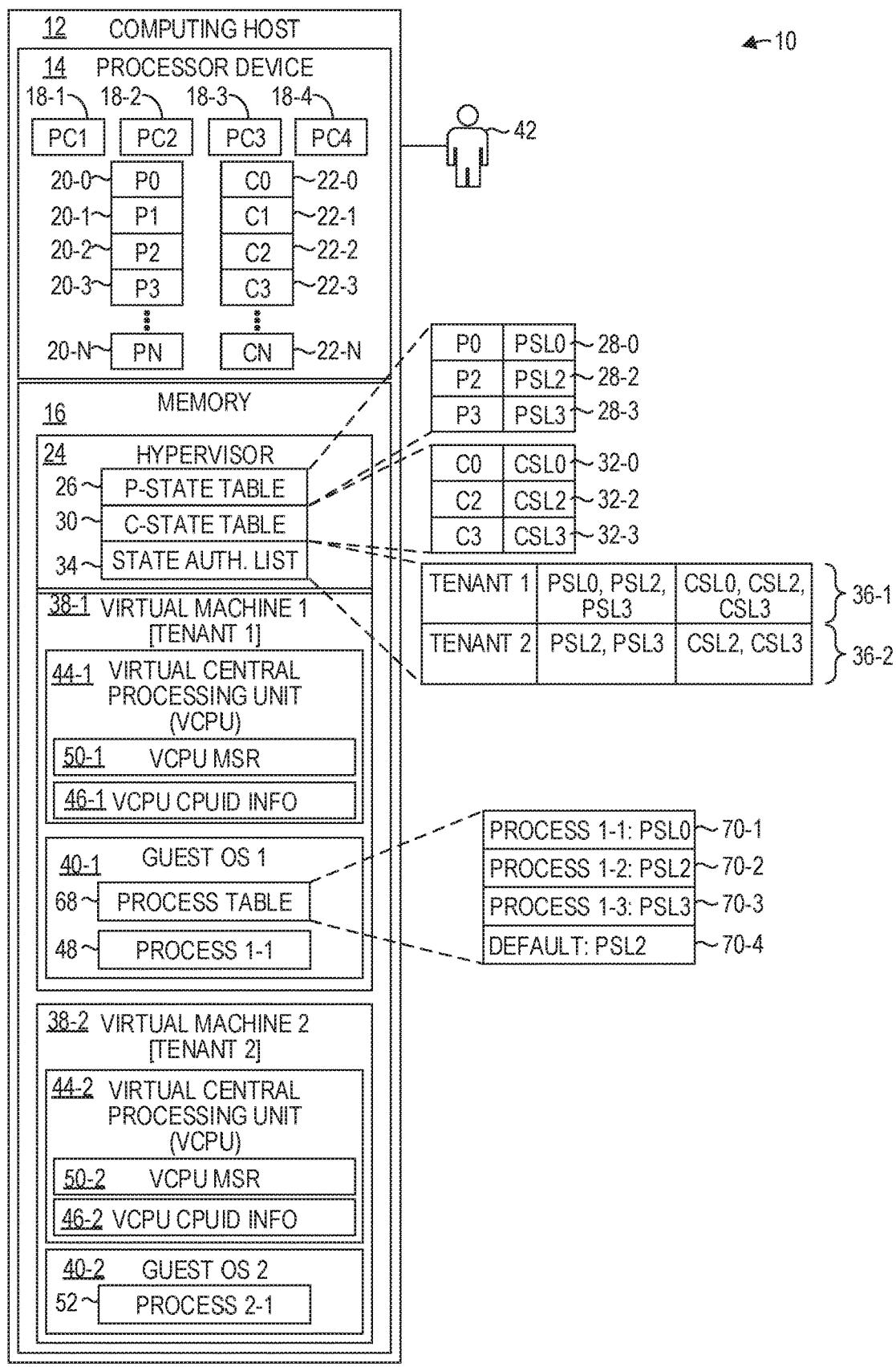
FIG. 5 is a block diagram of an environment in which processor core power management in a virtualized environment may be practiced according to another implementation.

FIG. 5 is a block diagram of the environment 10 in which processor core power management in a virtualized environment may be practiced according to another implementation. In this example, the guest OS 40-1, either prior to or after initiating the process 48, accesses a process table 68 that comprises a plurality of entries 70-1-70-3 (generally, entries 70), each entry 70 identifying a process that may be executed in the VM 38-1, and a corresponding P-state level at which the process should executed. The guest OS 40-1 determines that entry 70-1 identifies the process 48 and indicates that the process 48 should be initiated at the P-state level 28-0. In response to this determination, the guest OS 40-1 sends the request to the hypervisor 24 to set the P-state of the VCPU 44-1 to the requested P-state level 28-0 (PSL0). The hypervisor 24 then processes the request as described above. In some implementations, the process table 68 may include a default entry 70-4 that identifies a default P-state level if the process is not identified in the entries 70-1-70-3. In this example, if the guest OS 40-1 initiates a process that is not identified in the entries 70-1-70-3, the OS 40-1 sends a request to the hypervisor 24 to set the P-state of the VCPU 44-1 to the P-state level 28-2 (PSL2) based on the default entry 70-4.

Figure 6:
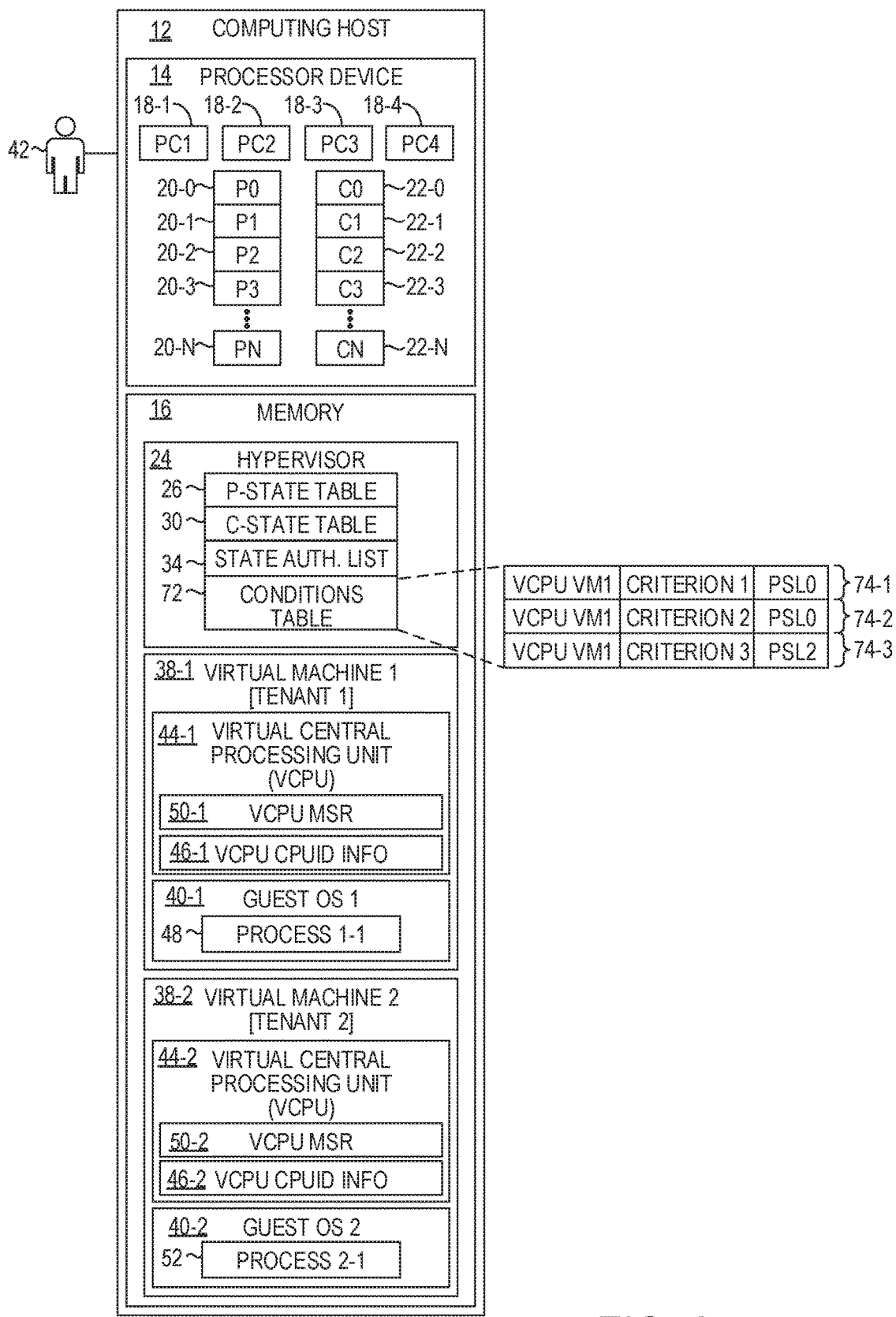
FIG. 6 is a block diagram of an environment in which processor core power management in a virtualized environment may be practiced according to another implementation.

FIG. 6 is a block diagram of the environment 10 in which processor core power management in a virtualized environment may be practiced according to another implementation. In this implementation, guest OSs of the computing host 12 may send to the hypervisor 24 a P-state criterion message that requests that the corresponding VCPU be set to a particular P-state level on the occurrence of some condition or conditions. The hypervisor 24 maintains such conditions in a conditions table 72. In this example, an entry 74-1 relates to a first condition which, upon occurrence, directs the hypervisor 24 to set the P-state of the processor core 18 that is associated with the VCPU 44-1 to the P-state that corresponds to the P-state level 28-0 (P0). An entry 74-2 relates to a second condition which, upon occurrence, directs the hypervisor 24 to set the P-state of the processor core 18 that is associated with the VCPU 44-1 to the P-state that corresponds to the P-state level 28-0 (P0). An entry 74-3 relates to a third condition which, upon occurrence, directs the hypervisor 24 to set the P-state of the processor core 18 that is associated with the VCPU 44-1 to the P-state that corresponds to the P-state level 28-2 (P2).

As an example, the condition identified in the entry 74-1 may comprise the receipt of a network request directed to a particular network port utilized by the process 48. For example, the process 48 may be a process that only periodically receives requests, but upon receiving a request, it is desirable that the request be processed as quickly as possible. Assume that a request is received over a network by the computing host 12. The hypervisor 24 determines that the request is directed to a port associated with the VM 38-1, and accesses the conditions table 72. The hypervisor 24 determines that the port matches the condition in the entry 74-1, and sets the P-state of the processor core 18 associated with the VCPU 44-1 to P0. The process 48 receives the request, and executes on the processor core 18 at a P-state of P0.

After the process 48 has serviced the request, the guest OS 40-1 may then send the hypervisor 24 a request to set the VCPU 44-1 to an idle C-state level 32-3 (C3). The hypervisor 24 receives the request and then sets the processor core 18 associated with the VCPU 44-1 to a C-state level of C3. Upon receipt of a subsequent request directed to the respective port, the process described above is repeated, allowing the process 48 to service requests on a processor core 18 at a P-state level of P0, yet when not servicing requests, allow the processor core 18 to be set to an idle C-state level of C3.

Figure 7:
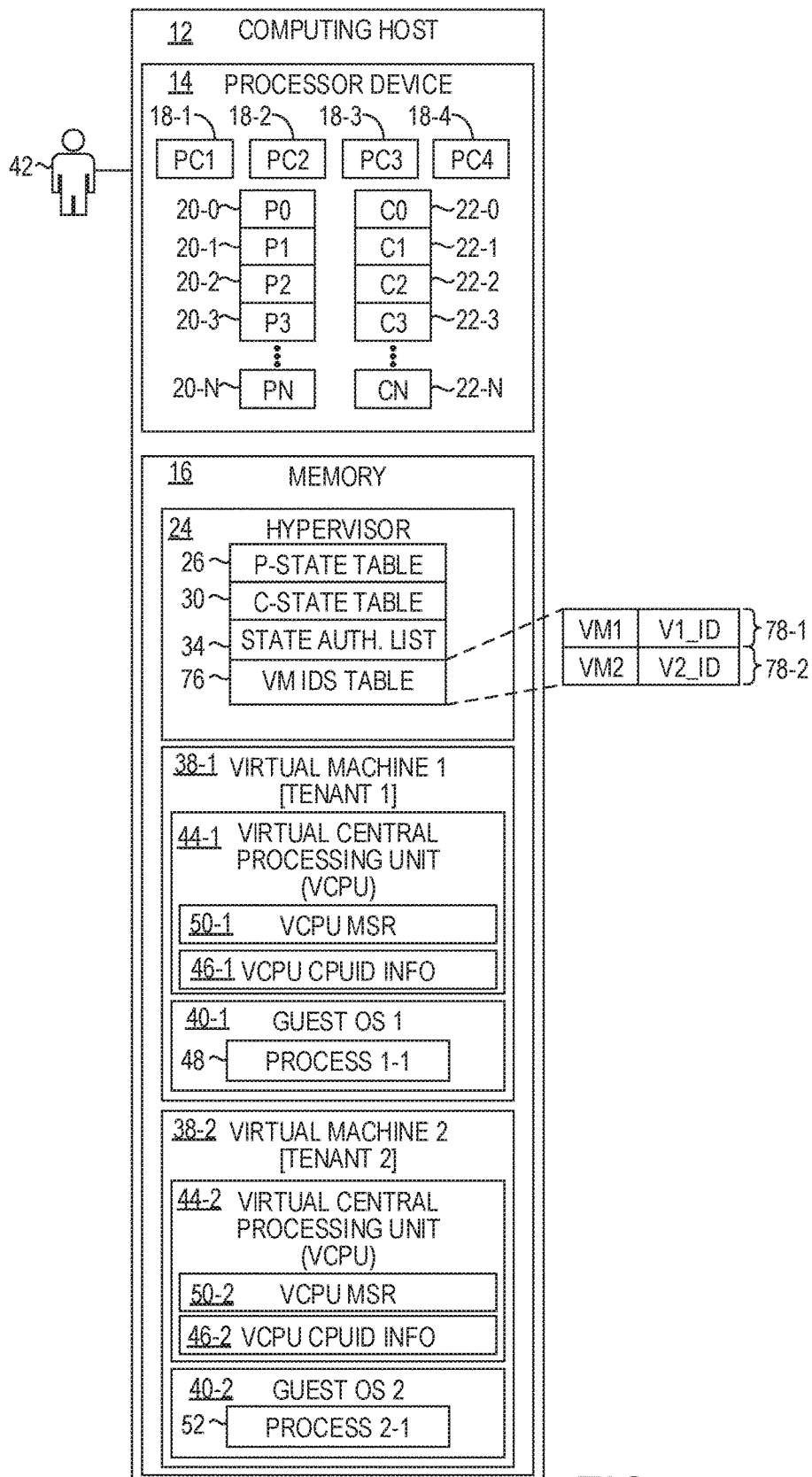
FIG. 7 is a block diagram of the environment in which processor core power management in a virtualized environment may be practiced according to another implementation.

FIG. 7 is a block diagram of the environment 10 in which processor core power management in a virtualized environment may be practiced according to another implementation. In this implementation, a guest OS is able to request that the P-state of a VCPU of another guest OS be set to a particular P-state level.

In one implementation, the hypervisor 24 maintains a VM identifiers (IDs) table 76 that contains VM IDs of the VMs executing on the computing host 12, which, in this example, includes the VMs 38-1 and 38-2. Entry 78-1 indicates that the VM ID of the VM 38-1 is "V1_ID" and that the VM ID of the VM 38-2 is "V2_ID". Guest OSs, such as the guest OS 40-1, may request the VM IDs of other VMs on the computing host 12. The hypervisor 24 may also include in the response to the guest OS 40-1 the P-state levels to which the other VMs are authorized to request that a VCPU be set. The guest OS 40-1 may then use the VM ID of the other VM to request that the hypervisor 24 set the VCPU of the other VM to a particular P-state level. As an example, assume that the guest OS 40-1 desires to receive data from the guest OS 40-2. The data may be received, for example, via remote direct memory access (RDMA). Immediately prior to requesting the data from the guest OS 40-2, the guest OS 40-1 may send a request to the hypervisor 24 to set the VCPU associated with the guest OS 40-2 to a P-state that corresponds to the P-state level 28-2. The hypervisor 24 receives the request and determines that the processor core 18-4 is associated with the VCPU 44-2. The hypervisor 24 sets the processor core 18-4 to the P-state of P2. The guest OS 40-1 sends a request to the guest OS 40-2 for data. The guest OS 40-2 receives the request and sends the data to the guest OS 40-1 via the processor core 18-4. In an application wherein the guest OS 40-2 merely provides a function of sending data upon request from another OS, the guest OS 40-2 may then send a request to the hypervisor 24 to set the VCPU 44-2 to an idle C-state level of CSL3. In this manner, the processor core 18-4 may be in a C-state of C3 when the guest OS 40-2 is not servicing requests for data, and may be in a P-state of P2 when the guest OS 40-2 is servicing requests for data.

Figure 8:
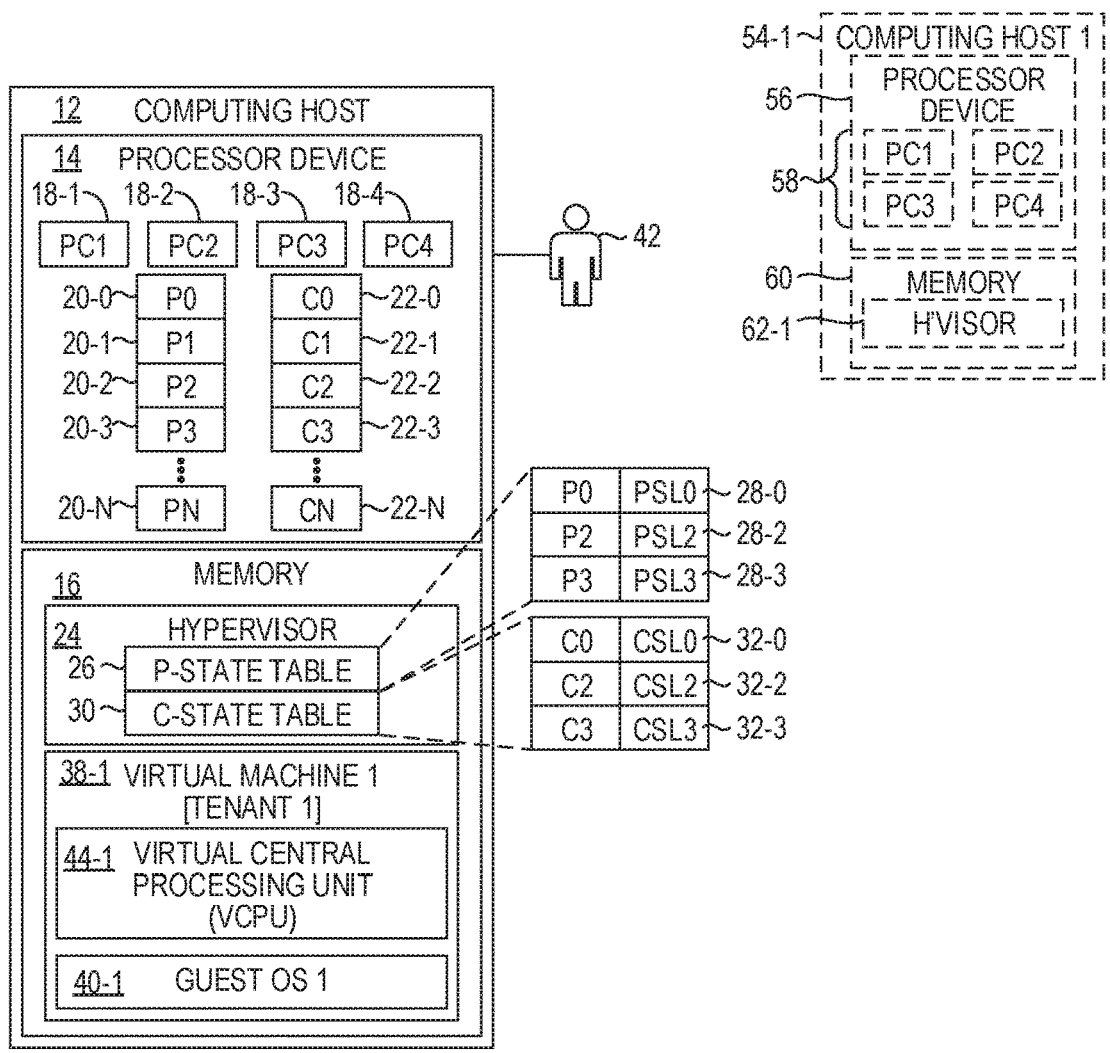
FIG. 8 is a simplified block diagram of the environment in which processor core power management in a virtualized environment may be practiced according to one implementation.

FIG. 8 is a simplified block diagram of the environment 10 in which processor core power management in a virtualized environment may be practiced according to one implementation. The environment 10 includes the computing host 12, the memory 16, and the processor device 14. The processor device 14 has the plurality of processor cores 18-1-18-4. The processor device 14 is coupled to the memory 16 to receive, by the hypervisor 24, from the guest OS 40-1 of the VM 38-1, a request to set the VCPU 44-1 of the VM 38-1 to a first requested P-state level 28-0, 28-2, 28-3 of the plurality of P-state levels 28-0, 28-2, 28-3. Based on the request, the hypervisor 24 associates the VCPU 44-1 with a processor core having a P-state that corresponds to the first requested P-state level 28-0, 28-2, 28-3. In one implementation, the processor core having the P-state that corresponds to the first requested P-state level 28-0, 28-2, 28-3 may comprise one of the processor cores 18-1-18-4 of the computing host 12. In another implementation, the processor core having the P-state that corresponds to the first requested P-state level 28-0, 28-2, 28-3 may comprise a processor core of a different computing host, such as a processor core 58 of the computing host 54-1.

Figure 9:
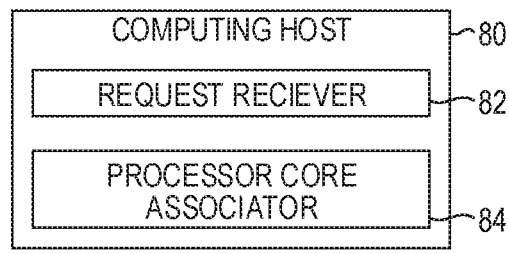
FIG. 9 is a block diagram of a computing host suitable for implementing aspects disclosed herein according to one implementation.

FIG. 9 is a block diagram of a computing host 80 suitable for implementing aspects disclosed herein according to one implementation. The computing host 80 includes a request receiver 82 that is configured to receive, by a hypervisor executing on a processor device of the computing host 80, from a guest OS of a first VM running on the computing host 80, a request to set a VCPU of the first VM to a first requested P-state level of a plurality of P-state levels. As discussed above, the request receiver 82 may comprise a hypercall function which can be invoked by the guest OS to communicate the request to the hypervisor to set the P-state of the VCPU to the requested P-state level. In another implementation, the request receiver 82 may comprise a function of the hypervisor that responds to a VMEXIT event caused by the guest OS 40-1 attempting to store P-state information in a VCPU MSR that is associated with the VCPU. The request receiver 82 may be implemented via executable software instructions configured to program a processor device to implement the functionality of receiving a request to set a VCPU of the VM to a first requested P-state level of a plurality of P-state levels, may comprise circuitry including, by way of non-limiting example, an application-specific integrated circuit (ASIC), field-programmable gate array (FPGA), or may comprise a combination of executable software instructions and circuitry.

The computing host 80 includes a processor core associator 84 configured to, based on the request, associate, by the hypervisor, the VCPU with a first processor core having a P-state that corresponds to the first requested P-state level. The processor core associator 84 may comprise, for example, hypervisor instructions that, in one implementation, determine the processor core that is associated with the VCPU, and then set the P-state of the processor core to a P-state that corresponds to the requested P-state level. In another implementation, the processor core associator 84 may comprise hypervisor instructions that, in response to the request, access a CH table and determine a different computing host that has processor cores that are set to the P-state that corresponds to the requested P-state level. The hypervisor instructions further interact with the different computing host to migrate the VM from the computing host to the different computing host. The processor core associator 84 may, discussed above, be implemented via executable software instructions, or may comprise circuitry including, by way of non-limiting example, an application-specific integrated circuit (ASIC), field-programmable gate array (FPGA), or may comprise a combination of executable software instructions and circuitry.

Figure 10:
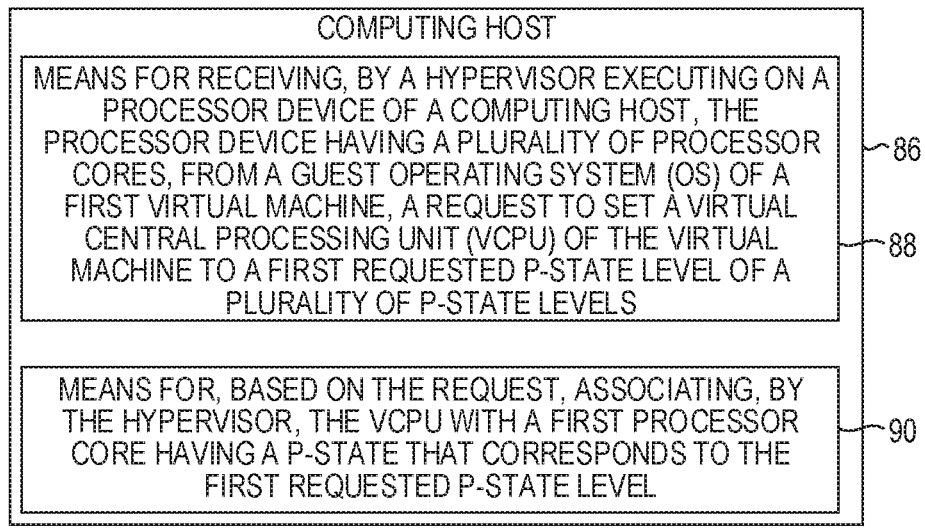
FIG. 10 is a block diagram of a computing host suitable for implementing aspects disclosed herein according to another implementation.

FIG. 10 is a block diagram of a computing host 86 according to additional implementations. The computing host 86 includes a means 88 for receiving, by a hypervisor executing on a processor device of a computing host, the processor device having a plurality of processor cores, from a guest OS of a first VM, a request to set a VCPU of the VM to a first requested P-state level of a plurality of P-state levels. The means 88 may be implemented in any number of manners, including, for example, via the request receiver 82 illustrated in FIG. 9.

The computing host 86 also includes a means 90 for, based on the request, associating, by the hypervisor, the VCPU with a first processor core having a P-state that corresponds to the first requested P-state level. The means 90 may be implemented in any number of manners, including, for example, via the processor core associator 84 illustrated in FIG. 9.

Figure 11:
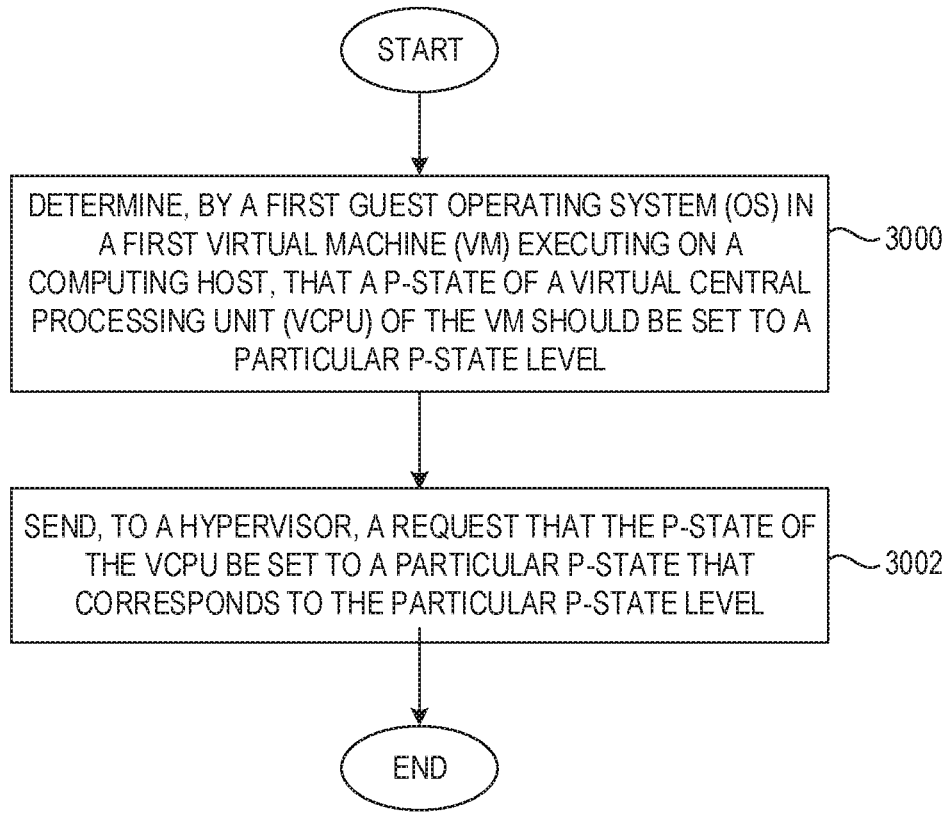
FIG. 11 is a flowchart of a method for processor core power management in a virtualized environment from the perspective of a guest operating system according to one implementation.

FIG. 11 is a flowchart of a method for processor core power management in a virtualized environment from the perspective of the guest OS 40-1 according to one implementation. The guest OS 40-1 determines that the P-state of the VCPU 44-1 of the VM 38-1 should be set to a particular P-state level (block 3000). The guest OS 40-1 sends, to the hypervisor 24, a request that the P-state of the VCPU 44-1 be set to the particular P-state that corresponds to the particular P-state level (block 3002).

Figure 12:
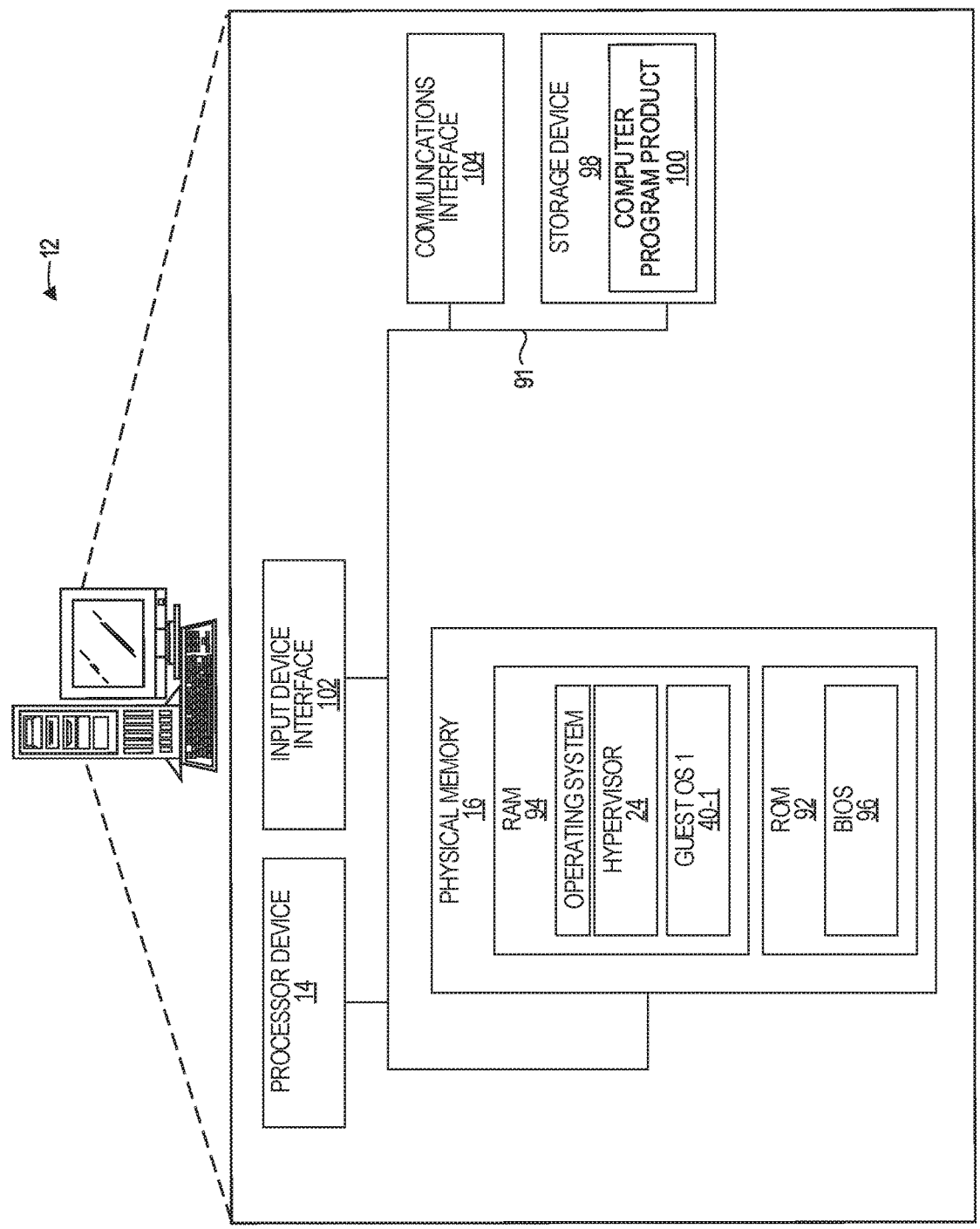
FIG. 12 is a block diagram of a computing host suitable for implementing examples according to one example.

FIG. 12 is a block diagram of the computing host 12 suitable for implementing examples according to one example. The computing host 12 may comprise any computing or electronic device capable of including firmware, hardware, and/or executing software instructions to implement the functionality described herein, such as a computer server, a desktop computing device, a laptop computing device, or the like. The computing host 12 includes the processor device 14, the memory 16, and a system bus 91. The system bus 91 provides an interface for system components including, but not limited to, the memory 16 and the processor device 14. The processor device 14 can be any commercially available or proprietary processor.

The system bus 91 may be any of several types of bus structures that may further interconnect to a memory bus (with or without a memory controller), a peripheral bus, and/or a local bus using any of a variety of commercially available bus architectures. The memory 16 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the computing host 12. The volatile memory 94 may also include a high-speed RAM, such as static RAM, for caching data.

The computing host 12 may further include or be coupled to a non-transitory computer-readable storage medium such as a storage device 98, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 98 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 98 and in the volatile memory 94, including an operating system and one or more program modules, such as the hypervisor 24 and the guest OS 40-1, which may implement the functionality described herein in whole or in part. It is to be appreciated that the examples can be implemented with various commercially available operating systems.

All or a portion of the examples may be implemented as a computer program product 100 stored on a transitory or non-transitory computer-usable or computer-readable storage medium, such as the storage device 98, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the hypervisor 24 and the guest OS 40-1 in the volatile memory 94, may serve as a controller, or control system, for the computing host 12 that is to implement the functionality described herein.

The operator 42 may also be able to enter one or more configuration commands through a keyboard, a pointing device such as a mouse (not illustrated), or a touch-sensitive surface such as a display device. Such input devices may be connected to the processor device 14 through an input device interface 102 that is coupled to the system bus 91 but can be connected by other interfaces such as a parallel port, an Institute of Electrical and Electronic Engineers (IEEE) 1394 serial port, a Universal Serial Bus (USB) port, an IR interface, and the like. The computing host 12 may also include a communications interface 104, such as an Ethernet transceiver or the like, suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a method that includes the steps of determining, by a first guest OS in a first VM executing on a computing host, that a P-state of a VCPU of the first VM should be set to a particular P-state level; and sending, to a hypervisor, a request that the P-state of the VCPU be set to a P-state that corresponds to the particular P-state level.

Example 2 is the method of example 1 wherein determining that the VCPU should be set to the particular P-state level comprises receiving, via an operator command, a request to set the VCPU to the particular P-state level.

Example 3 is the method of example 1 wherein determining that the P-state of the VPCU should be set to the particular P-state level comprises: determining that a process is to be executed by the VPCU; accessing a data structure that identifies the process and the particular P-state level; and based on the data structure, determining that the P-state of the VCPU should be set to the particular P-state level.

Example 4 is the method of claim 1 further comprising: initiating a process; determining that the process has completed processing for at least a period of time; and in response to determining that the process has completed processing for the at least the period of time, sending, to the hypervisor, a request that the VCPU be set to an idle C-state level.

Example 5 is the method of example 1 wherein sending, to the hypervisor, the request that the P-state of the VCPU be set to the P-state that corresponds to the P-state level comprises: sending a P-state criterion message to the hypervisor, the P-state criterion message identifying a condition and the particular P-state level.

Example 6 is the method of example 5 wherein the condition comprises the receipt of a request directed to a particular network port.

Example 7 is the method of example 1 further comprising: receiving, from a second guest OS in a second VM executing on the computing host, a guest identifier (ID); and wherein sending, to the hypervisor, the request that the P-state of the VCPU be set to the P-state that corresponds to the particular P-state level comprises: sending, to the hypervisor, a request that the P-state of a VCPU associated with the guest ID be set to the P-state that corresponds to the particular P-state level.

Example 8 is the method of example 7 further comprising: determining, by the first guest OS that the second guest OS is to send data to the first guest OS; and in response to determining, by the first guest OS that the second guest OS is to send data to the first guest OS, sending, to the hypervisor, the request that the P-state of the VCPU associated with the guest ID be set to the P-state that corresponds to the particular P-state level.

Example 9 is the method of example 1 further comprising receiving, by the first guest OS from the hypervisor, a plurality of different P-state levels to which the first guest OS can request that a P-state of a processor core be set.

Example 10 is the method of example 1 wherein sending the request comprises writing, to a model specific register of the VCPU, data that identifies the particular P-state level.

Example 11 is the method of example 1 further comprising invoking, by the first guest OS, a hypercall offered by the hypervisor to determine a plurality of P-state levels to which the VCPU can be set.

Example 12 is the method of example 1 further comprising invoking, by the guest OS, a CPUID function to determine a plurality of P-state levels to which the P-state of the VCPU can be set.

Example 13 is a computing host that includes a memory and a processor device having a plurality of processor cores. The processor device is coupled to the memory to determine, by a first guest OS in a first VM executing on a computing host, that a P-state of a VCPU of the first VM should be set to a particular P-state level; and send, to a hypervisor, a request that the P-state of the VCPU be set to a P-state that corresponds to the particular P-state level.

Example 14 is a computer program product stored on a non-transitory computer-readable storage medium and including instructions configured to cause a processor device to determine, by a first guest OS in a first VM executing on a computing host, that a P-state of a VCPU of the VM should be set to a particular P-state level; and send, to a hypervisor, a request that the P-state of the VCPU be set to a P-state that corresponds to the particular P-state level.

Example 15 is a computing host that comprises a request receiver that is configured to receive, by a hypervisor executing on a processor device of the computing host, from a guest OS of a first VM running on the computing host, a request to set a VCPU of the first VM to a first requested P-state level of a plurality of P-state levels; and a processor core associator configured to, based on the request, associate, by the hypervisor, the VCPU with a first processor core having a P-state that corresponds to the first requested P-state level.

Example 16 is a computing host comprising a means for receiving, by a hypervisor executing on a processor device of a computing host, the processor device having a plurality of processor cores, from a guest OS of a first VM, a request to set a VCPU of the first VM to a first requested P-state level of a plurality of P-state levels; and a means for, based on the request, associating, by the hypervisor, the VCPU with a first processor core having a P-state that corresponds to the first requested p-state level.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a first guest operating system (OS) of a first virtual machine (VM), that a first process is to be initiated, the first guest OS executing on a processor device of a computing host, the processor device having a plurality of processor cores;
   accessing a data structure that identifies a plurality of processes including the first process and a second process that is not executing, and, for each process of the plurality of processes, identifies a corresponding P-state level or C-state level;
   determining, by the first guest OS based on the data structure, that a first P-state level of a plurality of P-state levels corresponds to the first process;
   communicating a request to a hypervisor executing on the computing host to set a virtual central processing unit (VCPU) of the first VM to the first P-state level;
   receiving, by the hypervisor from the first guest OS, the request;
   based on the request, associating, by the hypervisor, the VCPU with a first processor core having a P-state that corresponds to the first P-state level;
   executing the first virtual machine utilizing the VCPU associated with the first processor core:
   subsequent to associating the VCPU with the first processor core, having the P-state that corresponds to the first P-state level, receiving, by the hypervisor from the first guest OS, a request to set the VCPU to a first idle C-state level; and
   in response to the request to set the VCPU to the first idle C-state level, associating the VCPU with a processor core having a C-state that corresponds to the first idle C-state level.

2. The method of claim 1 further comprising:
   determining, by the hypervisor, a plurality of different P-states to which the plurality of processor cores of the processor device can be set; and
   communicating, by the hypervisor to the first guest OS, the plurality of P-state levels based on the plurality of different P-states.

3. The method of claim 2 wherein the plurality of P-state levels is a subset of the plurality of different P-states.

4. The method of claim 1 further comprising:
   subsequent to associating the VCPU with the first processor core having the P-state that corresponds to the first P-state level, receiving, by the hypervisor from the first guest OS, a request to set the VCPU to a second P-state level; and
   in response to the request to set the VCPU to the second P-state level, associating the VCPU with a processor core having a P-state that corresponds to the second P-state level.

5. The method of claim 1 wherein associating the VCPU with the first processor core having the P-state that corresponds to the first P-state level comprises setting a P-state of the first processor core that is associated with the VCPU to the P-state that corresponds to the first P-state level.

6. The method of claim 1 wherein associating the VCPU with the first processor core having the P-state that corresponds to the first P-state level comprises:
   identifying, based on the first P-state level, a particular computing host of a plurality of computing hosts; and
   migrating the first VM to the particular computing host.

7. The method of claim 6 wherein identifying, based on the first P-state level, the particular computing host of the plurality of computing hosts further comprises:
   accessing a computing host table that correlates each computing host of the plurality of computing hosts to a corresponding P-state; and
   determining, based on the computing host table, that the corresponding P-state of the particular computing host corresponds to the first P-state level.

8. The method of claim 1 further comprising:
   receiving, by the hypervisor from a second guest OS of a second VM executing on the computing host, a request to set a VCPU of the second VM to a second P-state level of the plurality of P-state levels; and
   based on the request, associating the VCPU of the second VM with a second processor core having a P-state that corresponds to the second P-state level.

9. The method of claim 1 further comprising:
   receiving, by the hypervisor from a second guest OS of a second VM executing on the computing host, a request to set a VCPU of the second VM to a second P-state level of the plurality of P-state levels;
   accessing a P-state authorization list that identifies a subset of P-state levels of the plurality of P-state levels to which the second guest OS can request a VCPU be set;
   determining that the second P-state level is not in the subset of P-state levels; and
   in response to determining that the second P-state level is not in the subset of P-state levels, rejecting the request to set the VCPU of the second VM to the second P-state level and not associating the VCPU of the second VM with a second processor core having a P-state that corresponds to the second P-state level.

10. The method of claim 1 further comprising:
    determining, by the first guest OS, that the second process is to be initiated;
    accessing the data structure to determine the P-state level corresponding to the second process; and
    communicating, by the first guest OS, a request to the hypervisor to set a VCPU of the first VM to the P-state level corresponding to the second process.

11. A computing device comprising:
a memory; and
a processor device having a plurality of processor cores, the processor device being coupled to the memory to:
  determine, by a first guest operating system (OS) of a first virtual machine (VM), that a first process is to be initiated, the first guest OS executing on the processor device of the computing device;
  access a data structure that identifies a plurality of processes including the first process and a second process that is not executing, and, for each process of the plurality of processes, identifies a corresponding P-state level or C-state level;
  determine, by the first guest OS based on the data structure, that a first P-state level of a plurality of P-state levels corresponds to the first process;
  communicate a request to a hypervisor executing on the computing host to set a virtual central processing unit (VCPU) of the first VM to the first P-state level;
  receive, by the hypervisor from the first guest OS, the request;
  based on the request, associate, by the hypervisor, the VCPU with a first processor core having a P-state that corresponds to the first P-state level;
  execute the first virtual machine utilizing the VCPU associated with the first processor core;
  subsequent to associating the VCPU with the first processor core, having the P-state that corresponds to the first P-state level, receive, by the hypervisor from the first guest OS, a request to set the VCPU to a first idle C-state level; and
  in response to the request to set the VCPU to the first idle C-state level, associate the VCPU with a processor core having a C-state that corresponds to the first idle C-state level.

12. The computing device of claim 11 wherein to associate the VCPU with the first processor core having the P-state that corresponds to the first P-state level, the processor device is to:
  identify, based on the first P-state level, a particular computing host of a plurality of computing hosts; and
  migrate the first VM to the particular computing host.

13. The computing device of claim 11 wherein the processor device is further to:
  determine, by the first guest OS, the first P-state level of the plurality of P-state levels; and
  communicate the request to the hypervisor to set the VCPU to the first P-state level.

14. The computing device of claim 13 wherein to communicate the request to the hypervisor to set the VCPU to the first P-state level, the processor device is further to write the first P-state level to a model specific register (MSR) of the VCPU.

15. The computing device of claim 13 wherein to determine, by the first guest OS, the first P-state level of the plurality of P-state levels, the processor device is further to receive, via an operator command, information that identifies the first P-state level.

16. The computing device of claim 13 wherein to determine, by the first guest OS, the first P-state level of the plurality of P-state levels, the processor device is further to:
  determine, by the first guest OS, that a process is to be initiated; and
  access the data structure that identifies the process and the first P-state level.

17. The computing device of claim 13 wherein to determine, by the first guest OS, the first P-state level of the plurality of P-state levels, the processor device is further to:
  determine that a process is to be initiated by the first guest OS;
  access the data structure that identifies the plurality of processes and, for each process, identifies the corresponding P-state level or C-state level;
  determine that the process is not identified in the data structure; and
  determine a default P-state level, wherein the first P-state level is set to the default P-state level.

18. A non-transitory computer-readable storage medium that includes executable instructions to cause a processor device to:
  determine, by a first guest operating system (OS) of a first virtual machine (VM), that a first process is to be initiated, the first guest OS executing on a processor device of a computing host, the processor device having a plurality of processor cores;
  access a data structure that identifies a plurality of processes including the first process and a second process that is not executing, and, for each process of the plurality of processes, identifies a corresponding P-state level or C-state level;
  determine, by the first guest OS based on the data structure, that a first P-state level of a plurality of P-state levels corresponds to the first process;
  communicate a request to a hypervisor executing on the computing host to set a virtual central processing unit (VCPU) of the first VM to the first P-state level;
  receive, by the hypervisor from the first guest OS, the request;
  based on the request, associate, by the hypervisor, the VCPU with a first processor core having a P-state that corresponds to the first P-state level;
  execute the first virtual machine utilizing the VCPU associated with the first processor core;
  subsequent to associating the VCPU with the first processor core, having the P-state that corresponds to the first P-state level, receive, by the hypervisor from the first guest OS, a request to set the VCPU to a first idle C-state level; and
  in response to the request to set the VCPU to the first idle C-state level, associate the VCPU with a processor core having a C-state that corresponds to the first idle C-state level.

* * * * *